Patented Sept. 28, 1954

2,690,418

UNITED STATES PATENT OFFICE 2,690,418

ASPHALT PRODUCTION

David W. Young, Westfield, and Henry J. Franklin, Linden, N. J., assignors to Standard Oil Development Company, a corporation of Delaware No Drawing. Application April 1, 1952,
Serial No. 279,914

4 Claims. (Cl. 196—22)

This invention concerns a process for the manufacture of asphaltic material from petroleum crude oil or the distillation residue of petroleum oils. The invention concerns the treatment of residual oil with critical amounts of carbon tetrachloride at particular temperatures to secure an asphalt having a high softening point and characterized by high ductility. In this process less than 5% of carbon tetrachloride is reacted with the residual oil at temperatures above 350° F. at atmospheric pressure for a period of less than about one hour.

The present invention concerns the recovery of asphalts and the refining of asphalts obtained from petroleum oils. The principal objective of the process herein disclosed is to provide asphalts having unusual properties; in particular, asphalts are obtained which have unusually high penetration and ductility properties for a given softening point, although, as will be brought out, other desirable properties may also be realized. This unusual combination of characteristics is demanded in a number of applications, an outstanding example of which is the lining of irrigation canals. Asphalts employed to line irrigation canals ideally should have properties to enable the asphalt lining to retain its shape in hot weather, to be non-brittle in cold weather, and to conform to the contour of the surface of the canal without tearing. Asphalts having these properties must have a softening point of about 175° to 200° F., and must have high ductility and high values of penetration. It has been found that asphalts obtained by conventional processing methods do not have the necessary combination of properties. More precisely, the asphalts obtained by conventional processing techniques, in the range of softening points identified, have too low a ductility and too low a penetration to meet the desired characteristics.

It is therefore the principal object of this invention to provide an asphalt recovery and treating process which will vary the usual combination of softening point, penetration, and ductility properties. To bring out the manner in which these asphalt properties are affected, it is helpful to consider the results of subjecting crude residua to an oxidation treatment as achieved by conventional air blowing. Oxidation treatments of this character are well known to the art and it has been appreciated that the low temperature susceptibility of asphalts may to some extent be improved by oxidation. However, when air blowing is applied and continued, while the softening point of an asphalt is raised, the penetration is decreased and the ductility is lowered. Consequently, contra to this change in asphalt properties, the process of this invention provides an increase in penetration properties and an increase in ductility concomitant with the increase in softening point of the asphalt.

These new type CCl$_4$ treated asphalts may be blended with 1 to 5% polymers, such as rubber, butyl, GR-S, polyethylene, vistanex, etc., to make novel blends.

The process by which these desirable changes in asphalt properties are obtained depends upon the reaction of carbon tetrachloride with a residual oil under certain critical conditions. In this connection it may be noted that use of carbon tetrachloride in treating asphalts is not broadly novel. For example, in Patent No. 2,247,375, issued to Hersberger, July 1, 1941, it is suggested that carbon tetrachloride and other halogenated organic compounds be employed in a catalytic manner to affect the properties of asphalt. In general, this patent suggests use of large quantites of a halogenated compound under superatmospheric pressures in a manner to permit the recovery of virtually all of the halogenated compound employed. Asphalts obtained by this process are characterized by high melting points but very low ductility. The present invention may be considered to be an improvement of the process of this patent, permitting obtaining an asphalt not only having a high melting point but also having a high ductility. This is achieved by using carbon tetrachloride, not as a catalyst, but rather as a reaction agent presumably causing cross-linking of hydrocarbons present in the asphalt to yield an asphaltic composition of entirely different properties. In obtaining the benefits of this invention, a number of critical limitations of the process must be observed.

It now appears that under any conditions of treatment, carbon tetrachloride cannot be employed to provide a high melting point, high ductility asphalt from most sources. Thus it has been found that however employed, treatment of an oxidized asphalt or a steam refined asphalt with carbon tetrachloride results in a final asphaltic product having undesirably low ductility. However, provided a residual oil be employed as the starting point or the feed material, it is possible to obtain an asphalt of the properties described hereinbefore. The term "residual oil," by definition, is herein employed to identify the liquid or semi-solid residues obtained from the destructive distillation of non-asphaltic petroleum, from the distillation of semi-asphaltic and asphaltic petroleums, from the distillation of pressure tar, or from the fluxing of harder residual asphalts with heavy distillates. By way of example, a residual oil may be obtained from a conventional vacuum distillation zone for crude oil. In such a distillation system, normally gaseous hydrocarbons are withdrawn as an overhead product, while side stream products consisting of gasoline, kerosene, gas oil, lubricating oil, etc., may be withdrawn from side stream withdrawals. Residual oil is recovered as a bottoms product from such a distillation system and is characterized by a specific gravity at 77° F. of about 0.85 to 1.07. Normally such a residual oil will have a fusing point as determined by the ring and ball method falling within the range of about 32° to 120° F. A residual oil of this character may be converted to an asphalt of desirable properties by treatment with carbon tetrachloride in accordance with this invention.

The primary and essential treatment of the residual oil with carbon tetrachloride depends upon actual reaction of the carbon tetrachloride with the residual oil. It is presently believed that this reaction product causes a substitution reaction to occur, resulting in the evolution of HCl gas and causing the cross-linking of hydrocarbon molecules present in the residual oil. This reaction to some extent competes with thermal degradation reactions causing cleavage of the indicated structure. For this reason the reaction conditions must be closely controlled to obtain the desired benefits.

Three critical reaction conditions must be observed: first, the amount of carbon tetrachloride to be employed must be less than 5%. In this connection it has been found that use of more than 5% of carbon tetrachloride, while resulting in a high melting point asphalt causes production of an asphalt having poor properties of ductility. It is necessary to employ a temperature in the range of about 350° to 600° F. It has been found that carbon tetrachloride will not react with the residual oil below about 350° F., while thermal degradation above 600° F. would obviate the advantages of the process. The preferred temperature range to be employed is about 450° to 550° F. Again it is essential that the process be conducted so as to cause the removal of hydrogen chloride as this material is generated during the course of the reaction. If the hydrogen chloride is not removed, it appears that this agent causes undesirable reaction with, or degradation of the asphalt. In extreme cases hydrogen chloride results in the formation of very brittle asphaltic materials characterized by substantial coke formation. In order to conduct the process to permit removal of hydrogen chloride to avoid reaction with the asphalt, the preferred method of conducting the process comprises reaction of the asphalt with carbon tetrachloride under refluxing conditions at atmospheric pressure. Under atmospheric pressure the hydrogen chloride, at the temperatures of reaction employed, will be rapidly vaporized while the continual refluxing of the carbon tetrachloride will permit the desired carbon tetrachloride reaction to occur. If desired, other expedients can be employed to remove the hydrogen chloride. For example, suitable absorbents for hydrogen chloride could be mixed with the residual oil in carbon tetrachloride to absorb the HCl in situ during the course of the reaction, such as clay, talc, or asbestos.

The nature of this invention can be better undertsood by reference to the following exemplary data. This data has been selected to show the critical nature of the process of this invention as regards the factors hereinafter referred to.

In a first series of experiments, carbon tetrachloride was employed to treat a residual oil according to the disclosures of Patent No. 2,247,375. In these experiments a closed reaction vessel was employed so as to maintain the reactants under superatmospheric pressure. Varying amounts of carbon tetrachloride were employed at temperatures of 320° and 482° F. for a reaction time of 30 minutes. The residual oil employed had a melting point of 118 and a high ductility above 100+ at 77° F. The results of these experiments are indicated in Table I:

TABLE I

*Treatment of residual oil with carbon tetrachloride under superatmospheric pressure*

[Original residual oil properties—melting point=118; penetration at 77° F.=78; ductility at 77° F.=100+.]

| CCl₄ Wt. Percent | Temp., °F. | Reaction Time in Minutes | Ductility at 77° F. | Penetration at— | | | (B.+R.) Softening or Melting Pt. | Percent Chlorine |
|---|---|---|---|---|---|---|---|---|
| | | | | (77°/100/5″) | (32°/200/60″) | (115°/50/5″) | | |
| 1 | 320 | 30 | 13.0, 12.9 | 36, 37 | 17, 16 | 116, 114 | 145–143 | 1.01. |
| 3 | 320 | 30 | 11.0 | 33, 37 | 16, 17 | 96, 94 | 149–147 | 1.58. |
| 6 | 320 | 30 | 10.1, 10.4 | 37, 36 | 19, 19 | 100, 101 | 150–148 | 2.48. |
| 12 | 320 | 30 | 4.2, 3.9 | 25, 25 | 14, 13 | 49, 48 | 172–173 | 1.60. |
| 100 | 320 | 30 | 0.9, 1.2 | 9, 11, 10 | 7, 6, 6 | 16, 17 | 263–265 | 0.61. |
| 1 | 482 | 30 | 8.1, 8.4 | 27, 28, 28 | 12, 13 | 66, 67 | 157–155 | 0.56. |
| 3 | 482 | 30 | 3.8, 3.8 | 20, 21 | 10, 11 | 85, 84 | 187–186 | Not Det. |
| 6 | 482 | 30 | 2.9, 3.0 | 19, 18, 18 | 9, 8 | 36, 35 | 203–201 | 0.85. |
| 12 | 482 | 30 | 1.0, 1.0 | 9, 9 | 6, 6, 6 | 15, 14 | 274 | 0.87. |
| 100 | 482 | 30 | Coke | Coke | Coke | Coke | Coke | 0.55. |

It will be observed from this table that asphalts may be obtained having increasingly high melting points by treatment with increasingly high amounts of carbon tetrachloride. However, even when as little as 1% of carbon tetrachloride is employed as a treating agent, a very brittle asphalt is obtained, characterized by ductility values of less than about 13.0. In this connection it can be observed that for many applications such as the canal linings referred to, an asphaltic product having a ductility of greater than 25 is required. It is apparent from these data therefore that the treatment of a residual oil with carbon tetrachloride under conditions not permitting removal of evolved hydrogen chloride results in a brittle asphalt. This is borne out by the data in the last column of Table I showing that the final asphaltic product had a substantial portion of chlorine therein.

Data of a comparable nature were then obtained by treating this same residual asphalt according to the process of this invention. In these series of experiments refluxing was employed at atmospheric pressure to permit the continuous evolution and removal of hydrogen chloride while maintaining the carbon tetrachloride in the reaction zone. In all experiments a liquid temperature of about 500° F. was maintained. The amount of carbon tetrachloride employed varied from 0 to 100%. The results of these experiments are shown in Table II:

TABLE II

*Treatment of residual oil under reflux at atmospheric pressure*

| Wt. Percent $CCl_4$ | Reaction Time in Minutes | 77° F. Ductility | Penetration at 77°/100/5" | B. + R. Softening or Melting Pt. in ° F. |
|---|---|---|---|---|
| Blank | ---- | 100+ | 78 | 118 |
| 0 | 60 | 100+ | 78 | 120 |
| 1 | 30 | 100+ | 35 | 145 |
| 2 | 60 | 100+ | 50 | 185 |
| 3 | 60 | 100+ | 25 | 196 |
| 6 | 60 | 12.2 | 40 | 204 |
| 12 | 60 | 5.9 | 23 | 208 |
| 100 | (1) | (1) | (1) | (1) |

[1] Reaction temperature could not be reached.

It will be observed that in this case the softening point of the residual oil was advantageously increased. When more than 2% of carbon tetrachloride was employed, an asphalt was obtained having a softening point above 185° F. However, when employing less than 6% of carbon tetrachloride, by extrapolation less than about 5%, the properties of ductility were not lost and an asphalt was obtained having a ductility above about 25. Use of 6% or more of carbon tetrachloride however, resulted in a loss of ductility properties as shown by this data. It may be noted that in these experiments the final product contained substantially no chlorine. Furthermore, in these experiments the carbon tetrachloride did not act as a catalyst but reacted directly with the asphalt.

Other experiments were conducted to determine the asphaltic materials which could be treated by this process to obtain high melting point, high ductility asphalts. In a first series of experiments an oxidized residual oil was treated with carbon tetrachloride in accordance with this invention. The data obtained is presented in Table III. It will be observed from this data that when employing an oxidized asphalt, it is not possible to obtain a final asphalt having the high ductility desired.

TABLE III

*Temperature of reaction 450°–500° F. (reflux)*

| Wt. Percent $CCl_4$ | Reaction Time in Minutes | 77° F. Ductility | B. + R. Softening or Melting Pt. in °F. |
|---|---|---|---|
| Blank | ---- | 2.2 | 220 |
| 1 $CCl_4$ | 30 | 1.7 | 245 |
| 3 $CCl_4$ | 30 | 1.5 | 280 |
| 5 $CCl_4$ | 30 | 1.4 | 295 |
| 3 $CCl_4$ | 45 | 1.7 | 255 |

A similar series of experiments were then conducted using steam-reduced asphalt. Again it was found that in this case the final asphaltic material possessed a very low ductility. The data obtained is summarized in Table IV below:

TABLE IV

*Temperature of reaction 450°–500° F. (reflux)*

| Wt. Percent $CCl_4$ | Reaction Time in Minutes | 77° F. Ductility | B. + R. Softening or Melting Pt. in ° F. |
|---|---|---|---|
| Blank | ---- | 5.5 | 190 |
| 3 $CCl_4$ | 30 | 5.0 | 230 |
| 5 $CCl_4$ | 30 | 3.0 | 270 |
| 100 $CCl_4$ | 130 | 0.1 | 420 |

It is apparent from data of this character therefore that in order to use the process of this invention to obtain a high melting point, high ductility asphalt, it is essential that a residual oil be employed of the character hereinbefore identified. Other asphaltic materials or residual oils which have been subjected to steam reduction or oxidation treatments are not amenable to the process of this invention.

The criticality of the temperature of reaction was also established in a series of experiments in which temperatures varying from 75° F. to 650° F. were employed. This data established that the carbon tetrachloride failed to react with the asphalt below a temperature of about 350° F. Again, above temperatures of about 610° F., it was found that sufficient thermal degradation occurred to make the process unsuitable. This data is shown in Table V:

TABLE V

| Percent $CCl_4$ | Reaction Time | Temp., ° F. | 77° F. Ductility | B. + R. Softening or Melting Pt. ° F. |
|---|---|---|---|---|
| Blank | 30 | 75 | 100+ | 120 |
| 3 $CCl_4$ | 30 | 200 | 100+ | 121 |
| 3 $CCl_4$ | 30 | 250 | 100+ | 118 |
| 3 $CCl_4$ | 30 | 280 | 100+ | 122 |
| 3 $CCl_4$ | 30 | 320 | 100+ | 125 |
| 3 $CCl_4$ | 30 | 350 | 100+ | 155 |
| 3 $CCl_4$ | 30 | 420 | 77 | 165 |
| 3 $CCl_4$ | 30 | 660 | 2 | 320 |

What is claimed is:

1. A process for upgrading a residual oil to an asphalt characterized by a melting point above about 180° F., and a ductility above about 25, comprising reacting less than 5% of carbon tetrachloride with the residual oil at a temperature in the range of about 350° to 600° F., said reaction being conducted while removing hydrogen chloride evolved in the course of the reaction.

2. The process as defined by claim 1 in which the said reaction temperature is in the range of 450° to 550° F.

3. The process defined by claim 1 in which the reaction is conducted at atmospheric pressures under refluxing conditions whereby the hydrogen chloride is continuously removed during the course of the reaction.

4. A process for upgrading residual oils to an asphalt in which more than 1% and less than 5% of carbon tetrachloride is reacted with the residual oil at a temperature in the range of 350° to 600° F. under atmospheric pressures for a period less than 60 minutes whereby hydrogen chloride evolved during the reaction is continuously vaporized and removed from the reactants.

References Cited in the file of this patent

Chimica (Milan), vol. 2, pages 315–20 (1947) (Cianetti). (Abstracted in Chem. Abstracts, vol. 42 (1948), p. 9142f.)